United States Patent
Petro et al.

(10) Patent No.: US 12,445,681 B2
(45) Date of Patent: *Oct. 14, 2025

(54) METHODS AND APPARATUS TO OPTIMIZE REFERENCE SIGNATURE MATCHING USING WATERMARK MATCHING

(71) Applicant: The Nielsen Company (US), LLC, New York, NY (US)

(72) Inventors: James Petro, Dunedin, FL (US); Dan Nelson, Tampa, FL (US); Deborah Cross, Troy, AL (US); Raghuram Ranganathan, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/765,194

(22) Filed: Jul. 5, 2024

(65) Prior Publication Data

US 2024/0364964 A1 Oct. 31, 2024

Related U.S. Application Data

(63) Continuation of application No. 17/902,659, filed on Sep. 2, 2022, now Pat. No. 12,041,301, which is a
(Continued)

(51) Int. Cl.
*H04N 21/442* (2011.01)
*H04N 21/466* (2011.01)
*H04N 21/8358* (2011.01)

(52) U.S. Cl.
CPC ... *H04N 21/44204* (2013.01); *H04N 21/4667* (2013.01); *H04N 21/8358* (2013.01)

(58) Field of Classification Search
CPC ......... H04N 21/44204; H04N 21/4667; H04N 21/8358
See application file for complete search history.

(56) References Cited

U.S. PATENT DOCUMENTS

| | | | |
|---|---|---|---|
| 2011/0200224 A1* | 8/2011 | Kamperman | H04N 21/8358 382/100 |
| 2014/0150021 A1* | 5/2014 | Subramanian | H04N 21/235 725/36 |

(Continued)

*Primary Examiner* — Yassin Alata

(57) ABSTRACT

Methods, apparatus, systems and articles of manufacture are disclosed to optimize reference signature matching using watermark matching. An example disclosed herein includes selecting first unhashed reference signatures to evaluate for a second time segment of monitoring data based on watermark coverage of a first time segment of the monitoring data, the monitoring data obtained from a meter monitoring media presented by a media device and comparing the first unhashed reference signatures with first unhashed monitored signatures from the second time segment of the monitoring data. The example further includes, when a first media event associated with the monitoring data is not identifiable based on the comparing of the first of unhashed reference signatures with the first unhashed monitored signatures hashing the first unhashed monitored signatures to form a corresponding first hashed monitored signatures and comparing the first hashed monitored signatures with a library of reference hashed signatures to determine the first media event associated with the second time segment of the monitoring data.

20 Claims, 6 Drawing Sheets

Related U.S. Application Data continuation of application No. 17/114,117, filed on Dec. 7, 2020, now Pat. No. 11,438,649, which is a continuation of application No. 16/232,512, filed on Dec. 26, 2018, now Pat. No. 10,863,236.

(56) References Cited

U.S. PATENT DOCUMENTS

| | | | |
|---|---|---|---|
| 2014/0250450 A1* | 9/2014 | Yu ..................... | H04N 21/4331 725/19 |
| 2017/0323214 A1* | 11/2017 | Dureau .............. | H04N 21/8358 |

* cited by examiner

METHODS AND APPARATUS TO OPTIMIZE REFERENCE SIGNATURE MATCHING USING WATERMARK MATCHING

RELATED APPLICATION(S)

This patent application is a continuation of U.S. application Ser. No. 17/902,659, which was filed on Sep. 2, 2022, which is a continuation of U.S. application Ser. No. 17/114,117 (now U.S. Pat. No. 11,438,649), which was filed on Dec. 7, 2020, which is a continuation of U.S. application Ser. No. 16/232,512 (now U.S. Pat. No. 10,863,236), which was filed on Dec. 26, 2018. Priority to U.S. application Ser. No. 17/902,659, U.S. application Ser. No. 17/114,117 and U.S. patent application Ser. No. 16/232,512 is claimed. U.S. application Ser. No. 17/902,659, U.S. application Ser. No. 17/114,117 and U.S. patent application Ser. No. 16/232,512 are hereby incorporated by reference herein in their entireties.

FIELD OF THE DISCLOSURE

This disclosure relates generally to media identification systems and, more particularly, to methods and apparatus to optimize reference signature matching using watermark matching.

BACKGROUND

Some media includes embedded watermarks that allow subsequent detection of the media by decoding the watermarks in the presented media. For example, a broadcasting entity (e.g., a radio broadcaster, a television broadcaster, an internet streamer, etc.) may encode watermarks into media signals. A media monitoring entity may then detect the watermarks in the media signals during monitoring activities and accurately determine, based on identification information associated with the watermark, that the media (e.g., a television show, a film, a commercial etc.) corresponding to the media signals was presented to a user.

Additionally or alternatively, a media monitoring entity can generate audio signatures from a media signal. Audio signatures are a condensed reference that can be used to subsequently identify the media. These signatures can be hashed to allow faster matching in an audio signature database. In some examples, a media monitoring entity can monitor a media source feed (e.g., a television feed, etc.) to generate reference signatures representative of media presented via that media source feed. Such reference signatures can be compared to signatures generated by media monitors to credit viewership of the media.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
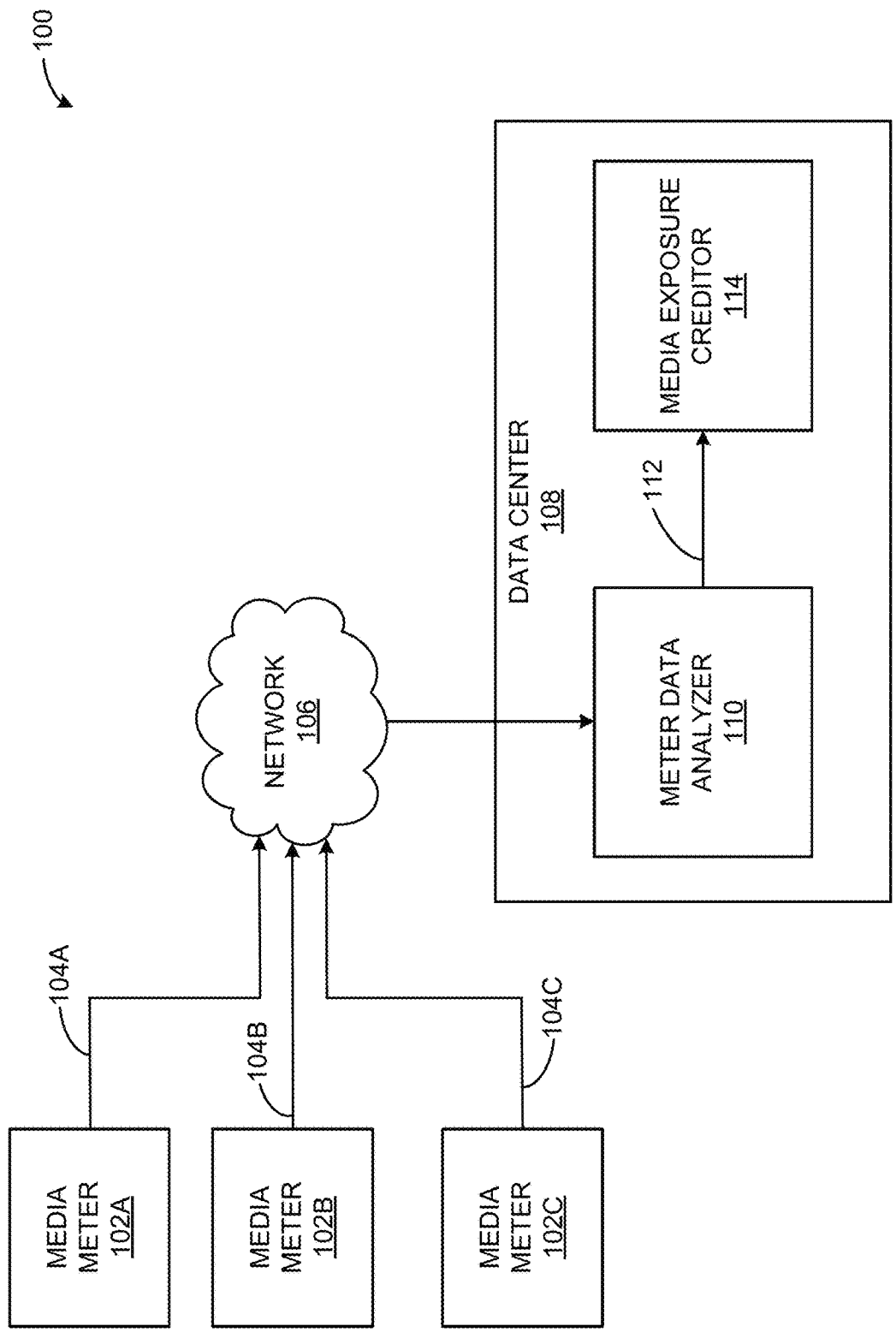
FIG. 1 is a block diagram of an example environment in which the teachings of this disclosure may be implemented

As used herein, the term "media" includes any type of content and/or advertisement delivered via any type of distribution medium. Thus, media includes television programming or advertisements, radio programming or advertisements, movies, web sites, streaming media, etc.

Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

In some examples, media monitoring information is aggregated to determine ownership and/or usage statistics of media devices, determine the media presented, determine audience ratings, relative rankings of usage and/or ownership of media devices, types of uses of media devices (e.g., whether a device is used for browsing the Internet, streaming media from the Internet, etc.), and/or other types of media device information. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.).

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the watermark embedded in the audio or video component so that the watermark is hidden. This embedding may be carried out utilizing psychoacoustic masking.

As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header).

To identify watermarked media, the watermark(s) are extracted and used to access a table of reference watermarks that are mapped to media identifying information. In some examples, media monitoring companies provide watermarks and watermarking devices to media providers with which to encode their media source feeds. In some examples, if a media provider provides multiple media source feeds (e.g., ESPN and ESPN 2, etc.), a media provider can provide a different watermark for each media source feed. In some examples, a media provider could encode a media source feed with an incorrect watermark (e.g., a watermark meant for ESPN could accidentally be encoded on ESPN2, etc.). In this example, crediting using only watermarking could result in the wrong media source feed being credited. Accordingly, examples disclosed herein utilize signature matching in conjunction with watermark matching.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the terms "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media source feeds. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

In some examples, media source feeds include media events. As used herein, the term "media event" refers to a discrete portion of a media source feed of sufficient length to encode a watermark. Accordingly, all or some of the media events associated with a watermarked media source feed can be associated with a specific encoded watermark. In some examples, a media monitor can generate one or more signatures when a media event is presented on an associated media device based on the media signal associated with the media event.

Media monitoring entities desire knowledge regarding how users interact with media devices such as smartphones, tablets, laptops, smart televisions, etc. In particular, media monitoring entities want to monitor media presentations made at the media devices to, among other things, monitor exposure to advertisements, determine advertisement effectiveness, determine user behavior, identify purchasing behavior associated with various demographics, etc. Media monitoring entities can provide media meters to people (e.g., panelists) which can generate media monitoring data based on the media exposure of those users. Such media meters can be associated with a specific media device (e.g., a television, a mobile phone, a computer, etc.) and/or a specific person (e.g., a portable meter, etc.).

Media monitoring entities can generate media reference databases that can include unhashed signatures, hashed signatures, and watermarks. These references are generated by a media monitoring entity (e.g., at a media monitoring station (MMS), etc.) by monitoring a media source feed, identifying any encoded watermarks and determining signatures associated with the media source feed. In some examples, the media monitoring entity can hash the determined signatures.

The reference database can be compared (e.g., matched, etc.) to media monitoring data (e.g., watermarks, unhashed signatures, hashed signatures, etc.) gathered by media meter(s) to allow crediting of media exposure. Monitored media can be credited using one, or a combination, of watermarks, unhashed signatures and hashed signatures. Matching using hashed signatures is computationally expensive because it includes both the generation of the hashed monitoring signatures and the hashed signature comparison. Additionally, the hashed signatures require additional data storage from the media monitoring entity. In comparison, matching using watermarks and unhashed signatures has small computational and storage requirements.

In some examples, media monitoring entities store generated reference databases and gathered monitoring data on cloud storage services (e.g., Amazon Web Services, etc.). To allow the crediting of time-shifted viewing (e.g., viewing media via a digital video recorder (DVR), etc.), the stored references are retained for a period time after the initial presentation of the media.

Methods and apparatus disclosed herein enable the optimization of reference signature matching using watermark matching. An example method disclosed herein includes selecting first unhashed reference signatures to evaluate for a second time segment of monitoring data based on watermark coverage of a first time segment of the monitoring data, the monitoring data obtained from a meter monitoring media presented by a media device and comparing the first unhashed reference signatures with first unhashed monitored signatures from the second time segment of the monitoring data. The example further includes, when a first media event associated with the monitoring data is not identifiable based on the comparing of the first of unhashed reference signatures with the first unhashed monitored signatures hashing the first unhashed monitored signatures to form a corresponding first hashed monitored signatures and comparing the first hashed monitored signatures with a library of reference hashed signatures to determine the first media event associated with the second time segment of the monitoring data.

FIG. 1 is a block diagram of an example environment 100 in which the teachings of this disclosure may be implemented. The example environment 100 includes an example first media meter 102A, an example second media meter 102B and an example third media meter 102C, which output example first monitoring data 104A, example second monitoring data 104B, and example third monitoring data 104C, respectively, to an example network 106. The environment 100 further includes an example data center 108, which includes an example meter data analyzer 110. In the illustrated example, the meter data analyzer 110 outputs identification data 112 to an example media exposure creditor 114.

The example media meters 102A, 102B, 102C collect media monitoring information. In some examples, the media meters 102A, 102B, 102C are associated with (e.g., installed on, coupled to, etc.) a specific media device. For example, an associated media device presents media (e.g., via a display, etc.) while, in other examples, the associated media device presents the media on separate media presentation equipment (e.g., speakers, a display, etc.). For example, the associated media device(s) can include a personal computer, an Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), televisions, desktop computers, laptop computers, servers, etc. In such examples, the media meters 102A, 102B, 102C may have direct connections (e.g., physical connections) to the devices to be monitored, and/or may be connected wirelessly (e.g., via Wi-Fi, via Bluetooth, etc.) to the devices to be monitored.

Additionally or alternatively, the media meters 102A, 102B, 102C are portable meters carried by one or more individual people. In the illustrated example, the media meters 102A, 102B, 102C monitor media presented to one or more people associated with the media meters 102A, 102B. 102C and generated the example monitoring data 104A, 104B, 104C. In some examples, the media meters 102A, 102B, 102C can detect encoded watermarks associated with media event(s) in presented media. In some examples, the media meters 102A, 102B, 102C can determine signatures associated with the presented media. For example, the media meters 102A, 102B, 102C can determine a signature (e.g., generate a signature, extract a signature, etc.) whenever a media event is presented on the associated media devices. Accordingly, the monitoring data 104A, 104B, 104C can include determined signatures and/or watermarks based on the media monitored by the media meters 102A, 102B, 102C. In some examples, the monitoring data 104A, 104B, 104C is associated with a discrete time period (e.g., five minutes, ten minutes, etc.). In such example, the monitoring data 104A, 104C, 104C can include at least one signature or watermark associated with each media event detected by the media meters 102A, 102B, 102C.

The example network 106 is a network used to transmit the monitoring data 104A, 104B, 104C to the data center 108. In some examples, the network 106 can be the Internet or any other suitable external network. In other examples, the network 106 can be a cable broadcast system and the monitoring data 104A, 104B, 104C could be return path data (RPD). In other examples, any other suitable mans of transmitting the monitoring data 104A, 104B, 104B to the data center 108 can be used.

The example data center 108 is an execution environment used to implement the example meter data analyzer 110 and the example media exposure creditor 114. In some examples, the data center 108 is associated with a media monitoring entity. In some examples, the data center 108 can be a physical processing center (e.g., a central facility of the media monitoring entity, etc.). Additionally or alternatively, the data center 108 can be implemented via a cloud service (e.g., AWS, etc.). In this example, the data center 108 can further store and process generated watermark and signature reference data.

The example meter data analyzer 110 processes the gathered media monitoring data to identify media event associates with the monitoring data 104A, 104B, 104C. For example, the meter data analyzer 110 can compare the monitoring data 104A, 104B, 104C to generated reference data to determine what media events are associated with the monitoring data 104A, 104B, 104C. In some examples, the meter data analyzer 110 can hash the signatures included in the monitoring data 104A, 104B, 104C. In some examples, the meter data analyzer 110 can identify media event(s) by matching watermarks, unhashed signatures and/or hashed signatures. The meter data analyzer 110 analyzes the monitoring data 104A, 104B, 104C to determine if the signature associated monitoring data 104A, 104B, 104C is to be hashed. For example, the meter data analyzer 110 can divide the first monitoring data 104A into discrete time segments and analyze each time segment to determine if the watermarks associated with the time segments allow signature hashing to be avoided. For example, the meter data analyzer 110 can determine if the watermark(s) associated with a time segment are associated with a single offset and a single media source feed (e.g., a television station, etc.). In some examples, if the watermark(s) associated with the time segment are associated with a single station and a single offset, the meter data analyzer 110 can credit media exposure without hashing the generated signatures. In some examples, the media data analyzer can generate the identification data 112. In some examples, media events identified using watermarks matching, unhashed signature matching, and/or hashed signature matching can be used to determine what reference signatures are used in matching media events in adjacent time segments. An example implementation of the meter data analyzer 110 is described below in conjunction with FIG. 2.

The example identification data 112 includes the information required to credit user(s) associated with the media meters 102A, 102B, 102C with exposure to particular media events. For example, the identification data 112 can include direct associations between monitoring data 104A, 104B, 104C and particular media. The example media exposure creditor 114 uses the identification data 112 to credit user(s) with exposure. In some examples, the media exposure creditor 114 generates a report including data metrics that may be presented to media providers.

Figure 2:
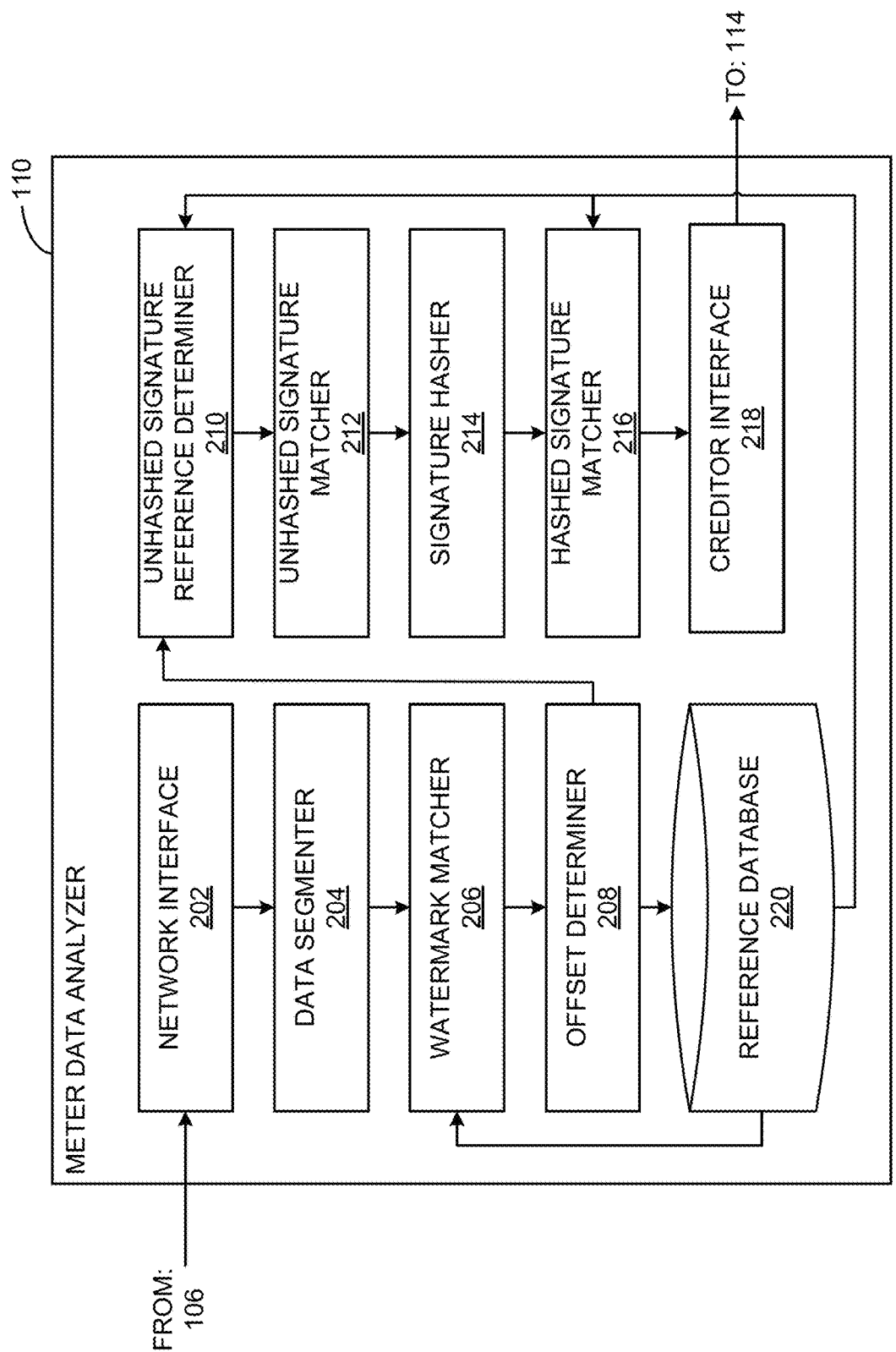
FIG. 2 is a block diagram of an example implementation of the meter data analyzer of FIG. 1.

FIG. 2 is a block diagram of an implementation of the meter data analyzer 110 of FIG. 1. In the illustrated example, the meter data analyzer 110 includes an example network interface 202, an example data segmenter 204, an example watermark matcher 206, an example offset determiner 208, an example unhashed signature reference determiner 210, an example unhashed signature matcher 212, an example signature matcher 212, an example hashed signature matcher 216, an example creditor interface 218 and an example reference database 220.

The example network interface 202 allows the meter data analyzer 110 to receive the monitoring data 114A, 114B, 114C from the example network 106. In some examples, the network interface 202 can convert the monitoring data 114A, 114B, 114C into a format readable by the media data analyzer 116. In some examples, the network interface 202 can be in continuous communication with the network 106, the first media meter 102A, the second media meter 102B and/or the third media meter 102C. In other examples, the network interface 202 can be in periodic communication with the network 106, the first media meter 102A, the second media meter 102B and/or the third media meter 102C. In some examples, the network interface 202 can be absent. In such examples, the media meters 102A, 102B, 102C can be in direct communication with the network interface 202. For example, if the meter data analyzer 110 is implemented via a cloud service, some or all of the media meters 102A, 102B, 102C can directly upload the monitoring data 104A, 104B, 104C directly to the cloud service.

The example data segmenter 204 can divide monitoring data into discrete time segments. For example, the data segmenter 204 can divide the first monitoring data 104A into non-overlapping equal segments of a predetermined length, such as one minute long segments. For example, if the first monitoring data 104A is five minutes long, the data segmenter 204 can divide the first monitoring data 104A into five one minute long segments. In some examples, each time segment includes one or more media events. In other examples, the data segmenter 204 can segment a media source into a time segment of any other suitable length (e.g., thirty seconds, five seconds, five minutes, etc.). In some examples, a time segment of the first monitoring data 104A can include signatures determined by the first media meter 102A associated with the time segment and/or detected watermarks associated with that time segment by the first media meter 102A.

The example watermark matcher 206 matches detected watermarks of the monitoring data 104A, 104B, 104C and the watermarks in the example reference database 220. For example, for each generated time segment, the watermark matcher 206 can determine if the detected watermarks match any watermarks in the reference database 220. In some examples, the encoded watermarks include a station identification (SID) which allows the search of the reference database 220 to be expedited. In some examples, the watermark matcher 206 can output match results that include the media source(s) associated with the time segment and the timestamp of the matched media event(s) (e.g., when the media event was originally broadcast, etc.). In some examples, the watermark matcher 206 can output media event match results for a single time segment that are associated with multiple media source feed(s). For example, an analyzed time segment could include watermarks associated with multiple media source feeds if a user changed media sources during the time segment (e.g., user changed television channels, etc.). In some examples, the watermark matcher 206 can analysis a time segment to determine if any watermarks are present. In such examples, the operation of the watermark matcher 206 could be excluded if the time segment does not have any associated watermarks.

The example offset determiner 208 determines the offset between each watermark of the time segment and the matched media events. For example, the offset determiner could determine the offset between the timestamp of the monitored watermark (e.g., when the media monitor detected the watermark, etc.) and the timestamp of the matched media event (e.g., when the media event was originally broadcast, etc.). In some examples, an analyzed time segment could have multiple associated offsets if a user paused, fast forwarded or rewind a media source feed (e.g., using a digital video recorder (DVR), etc.) during the time segment. In some examples, the offset determiner 208 could determine that an offset is zero, which indicates that a media event was presented live to the media meter.

The example unhashed signature reference determiner 210 determines which signatures of the reference database 220 to match the signatures of the monitoring data against. For example, the unhashed signature reference determiner 210 can select reference signatures based on the watermark matching results. For example, if the watermark matcher 206 identified media events in a first time segment, the reference determiner can select reference signatures associated with the same media source and offset associated with the second time segment. For example, if the watermark matcher 206 determined that first media source was matched for the first four segments of a five segment long monitoring data with a twelve second offset, the unhashed signature reference determiner 210 would select signatures associated the fifth time segments with a twelve second offset. In some examples, the signature reference determiner 210 can selected multiple sets of reference signatures (e.g., adjusting the offset of the selected signatures, etc.).

The example unhashed signature matcher 212 compares signatures selected by the unhashed signature reference determiner 210 and signatures of the monitoring data. For example, the unhashed signature matcher 212 can identify media events of the monitoring data 104A using unhashed signatures. In some examples, the unhashed signature matcher 212 does not conduct matching in time segments (e.g., segments created by the data segmenter 204, etc.) of the monitoring data 104A that were previously identified the watermark matcher 206. In some examples, the unhashed signature matcher 212 and the unhashed signature reference determiner 210 can work iteratively.

The example signature hasher 214 can hash the unhashed signatures of the first monitoring data 114A, the second monitoring data 114B and/or the third monitoring data 114C. For example, the signature hasher 214 can process a determined signature associated the monitoring data 114A, 114B, 114C with a hashing algorithm to generate a corresponding hashed signature. The generated hashed signature can be used to expedite the matching process. However, the operation of the signature hasher 214 is computationally extensive. Accordingly, in some examples, if a monitored media event has been matched using by the watermark match 206, the monitored signatures associated with that media event are not hashed. Additionally or alternatively, if a monitored media event has been identified using unhashed signature matching, the monitored signatures associated with that media event are not hashed. In other examples, the signature hasher 214 can determine whether or not to hash the signatures by any other suitable standard.

The example hashed signature matcher 216 matches the hashed signatures generated by the signature hasher 214 and hashed signatures of the reference database 220 to identify media associated with monitoring data. In some examples, the hashed signature matcher 216 compares the hashed signature using a hash table of the reference database 220 to identify the media. In some examples, the hashed signature matcher 216 can use identified hashed signatures to identify unhashed signatures for further matching. In such examples, unhashed signature matching can be used to identify the media associated with the monitoring data not already identified. In some examples, the hashed signature matcher 216 can work iteratively with the unhashed signature determiner 210 and/or unhashed signature matcher 212.

The example creditor interface 218 generates the identification data 112 based on the output of the watermark matcher 206, the unhashed signature matcher 212 and/or the hashed signature matcher 216. In some examples, the creditor interface 218 identifies what media event(s) are associated with each data segment of the media exposure creditor 114. In some examples, the creditor interface 218 transmits the identification data 112 to the media exposure creditor 114.

The example reference database 220 includes generated reference signatures created by the data center 108. In some examples, the reference database 220 includes reference watermarks, reference unhashed signatures and/or referenced hashed signatures. In some examples, the media monitoring entity associated with the reference database 220 can directly monitor media source feeds to generate reference watermarks, reference unhashed signatures and/or hashed signatures. In some examples, each reference of the reference database 220 is associated with a specific media event broadcast on a media source feed. In some examples, each reference of the reference database 220 is associated with a timestamp, which indicates when the related media event was originally broadcast. In some examples, the reference database 220 can include a library (e.g., database, table, etc.) of reference hashed signatures.

While an example manner of implementing the meter data analyzer 110 of FIG. 1 is illustrated in FIG. 2, one or more of the elements, processes and/or devices illustrated in FIG. 2 may be combined, divided, re-arranged, omitted, eliminated and/or implemented in any other way. Further, the example network interface 202, the example data segmenter 204, the example watermark matcher 206, the example offset determiner 208, the example unhashed signature reference determiner 210, the example unhashed signature matcher 212, the example signature matcher 212, the example hashed signature matcher 216, the example creditor interface 218 and the example reference database 220, and/or, more generally, the meter data analyzer 110 of FIG. 2 may be implemented by hardware, software, firmware and/or any combination of hardware, software and/or firmware. Thus, for example, any of the example network interface 202, the example data segmenter 204, the example watermark matcher 206, the example offset determiner 208, the example unhashed signature reference determiner 210, the example unhashed signature matcher 212, the example signature matcher 212, the example hashed signature matcher 216, the example creditor interface 218 and the example reference database 220 and/or, more generally, the example meter data analyzer 110 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 202, the example data segmenter 204, the example watermark matcher 206, the example offset determiner 208, the example unhashed signature reference determiner 210, the example unhashed signature matcher 212, the example signature matcher 212, the example hashed signature matcher 216, the example creditor interface 218 and the example reference database 220 is/are hereby expressly defined to include a non-transitory computer readable storage device or storage disk such as a memory, a digital versatile disk (DVD), a compact disk (CD), a Blu-ray disk, etc. including the software and/or firmware. Further still, the example meter data analyzer 110 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the meter data analyzer 110 of FIG. 2 is shown in FIG. 1. The machine readable instructions may be an executable program or portion of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program(s) are described with reference to the flowcharts illustrated in FIGS. 3-5, many other methods of implementing the example meter data analyzer 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 3:
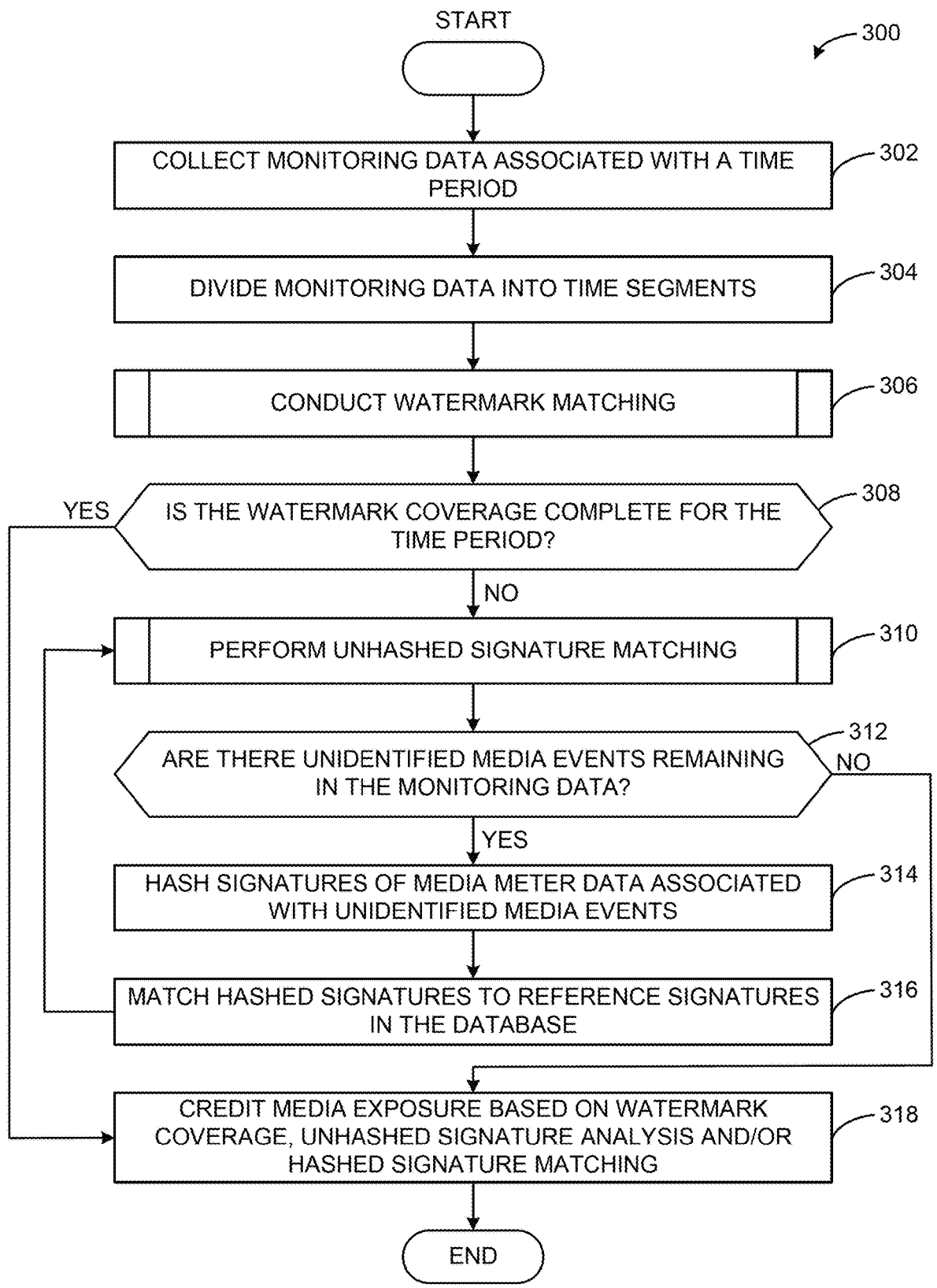
FIGS. 3-5 are flowcharts representative of machine readable instructions that may be executed to implement the meter data analyzer of FIG. 1.

The program 300 of FIG. 3 includes block 302. At block 302, the network interface 202 collects media meter data associated with a time period. For example, the network interface 202 allows the meter data analyzer 110 to receive monitoring data 104A, 104B, 104C from the example network 106. In some examples, the network interface can convert the received monitoring data 104A, 104B, 104C into a format readable by the meter data analyzer 110.

At block 304, the data segmenter 204 divides the monitoring data into time segments. For example, the data segmenter 204 can divide the data into non-overlapping equal segments of a predetermined length, such as one minute long segments. For example, if monitoring data (e.g., the monitoring data 104A, 104B, 104C, etc.) is five minutes long, the data segmenter 204 could divide the data into five one minute long segments. In some examples, the data segmenter 204 can associate signatures and/or watermarks of the monitoring data with a specific time segment based on timestamps associated with the signatures and/or watermarks.

At block 306, the watermark matcher 206 conducts matching. For example, the watermark matcher 206 can match detected watermarks matcher 206 with watermark references in the example reference database 220. The execution of block 306 is discussed in further detail in conjunction with FIG. 4.

At block 308, the unhashed signature reference determiner 210 determines if the watermark coverage is complete for the time period. In some examples, the unhashed signature reference determiner 210 can monitor for an indicator from the watermark matcher 206 and/or offset determiner 208. If the watermark coverage is complete, the program 300 advances to block 318. If the watermark coverage is not complete, the program 300 advances to block 310. In some examples, skipping the execution of blocks 308, 310, 312, 316 allows a vast reduction in the computational resources required to identify media events when compared to historic methods. In some examples, given the commonality of watermark encoding, blocks 308, 310, 312, 316 can be skipped frequently.

At block 310, the unhashed signature matcher 212 performs unhashed signature matching. For example, the unhashed signature matcher 212 can compare signatures of the monitoring data to reference signatures of the reference database 220. The execution of block 310 is discussed in further detail in conjunction with FIG. 5.

At block 312, the hashed signature matcher 216 determines if there are unidentified media events remaining in the monitoring data. For example, the hashed signature matcher 216 can determine if there are time segments of the monitoring data with unidentified media events. If there are unidentified media events remaining in the monitoring data, the program 300 advances to block 314. If there are not unidentified media events remaining in the monitoring data, the program 400 advances to block 318.

At block 314, the signature hasher 214 hashes signatures of the monitoring data associated with unidentified media. For example, the signature hasher 214 can hash the unhashed signatures of monitoring data (e.g., the monitoring data 104A, 104B, 104C, etc.) associated with time segments with unidentified media. In some examples, the signature hasher 214 can hash the signatures associated with time segments with unidentified media by processing them using a hashing algorithm.

At block 316, the hashed signature matcher 216 matches hashed signatures to reference fingerprints in the reference database 220. For example, the hashed signature matcher 216 can match the hashed signatures with signatures in the reference database 220. In such examples, the hashed signature matcher 216 can use a hash table associated with the reference database 220.

At block 318, the creditor interface 218 credits media exposure based on watermark coverage unhashed signature analysis and/or hashed signature matching. For example, the creditor interface 218 can transfer the example identification data 112 to the media exposure creditor 114. In some examples, the creditor interface 218 can use the identified media (e.g., as determined during the execution of blocks 306, 310 and/or 316, etc.). The program 300 then ends.

Figure 4:
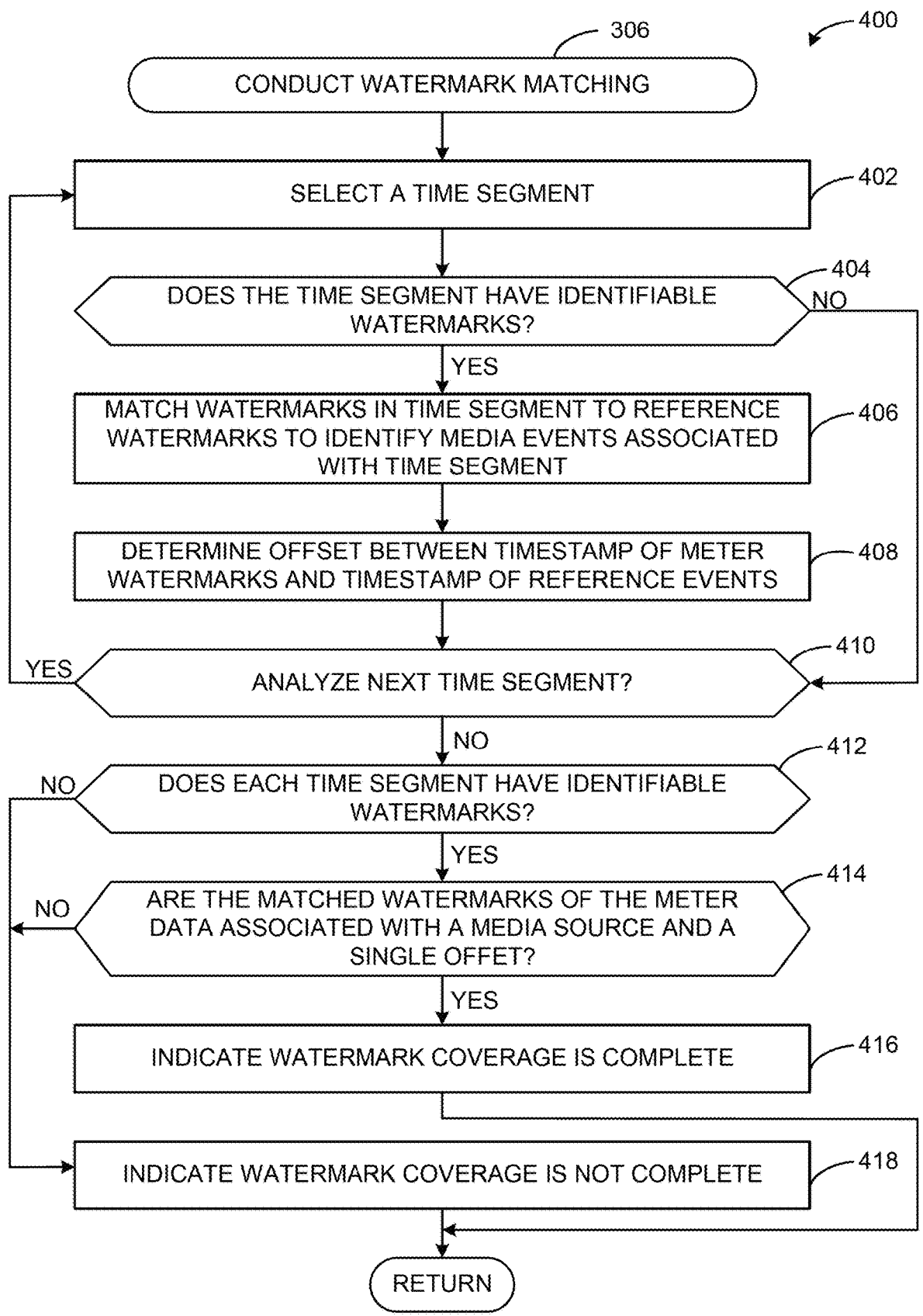

The program 400 of FIG. 4 describes the execution of block 306 of FIG. 3 in greater detail and includes block 402. At block 402, the watermark matcher 206 selects a time segment to analyze. For example, if no time segment has been analyzed yet, the watermark matcher 206 can select the first time segment (e.g., the time segment with the earliest timestamps, etc.). In other examples, the watermark matcher 206 can select a time segment with adjacent timestamps to a previously selected time segment. In other examples, the watermark matcher 206 can select time segments by any other suitable method (e.g., randomly, semi-randomly, etc.).

At block 404, the watermark matcher 206 determines if the time segment has any identifiable watermarks. For example, the watermark matcher 206 can determine if the monitoring data includes any watermarks associated within the time period associated with the time segment. If the time segment does have identifiable watermarks, the program 400 advances to block 406. If the time segment does not have identifiable watermarks, the program 400 advances to block 410.

At block 406, the watermark matcher 206 matches watermarks in the time segment to reference watermarks to identify media events associated with the time segment. For example, the watermark matcher 206 can match watermarks in the monitoring data (e.g., the monitoring data 104A, 104B, 104C, etc.) to reference watermarks of the reference database 220 to identify the media event(s) associated with the time segment. In some examples, the watermarks in the monitoring data can be associated with multiple media events, in such examples, the watermark matcher 206 can identify each media event.

At block 408, the offset determiner 208 determines offset between the timestamp of the meter watermarks and the timestamp of the reference events. For example, the offset determiner 208 can determine the offset between the timestamp of a matched watermark of the monitoring data 104A (e.g., when the watermark was decoded by the media meter 102A, etc.) and the timestamp of the corresponding media event (e.g., when the media event was originally broadcast, etc.). In some examples, the offset may be zero, which indicates the media event was viewed live. In some examples, the offset may be non-zero, which indicates the media event was viewed by time-shifted viewing.

At block 410, the watermark matcher 206 determines if another time segment is to be analyzed. For example, the watermark matcher 206 can determine if there are any unanalyzed time segments remaining. If another time segment is to be analyzed, the program 400 returns to block 402. If another time segment is not to be analyzed, the program 400 advances to block 412.

At block 412, the watermark matcher 206 determines if each time segment had identifiable watermark(s). If each segment did not have identifiable watermarks, the program 400 advances to block 418. If each segment did have identifiable watermarks, the program 400 advances to block 414.

At block 414, the offset determiner 208 determines if each matched watermark of the meter data associated with a single media source and a single offset. If each matched watermark of the monitoring data is associated with a single media source and a single offset, the program 400 advances to block 416, If each matched watermark of the monitoring data is not associated with a single media source and a single offset, the program 400 advances to block 418. At block 416, the watermark matcher 206 indicates watermark coverage of the monitoring data is complete. At block 418, the watermark matcher 206 indicates watermark coverage of the monitoring data is not complete. The program 400 then ends.

Figure 5:
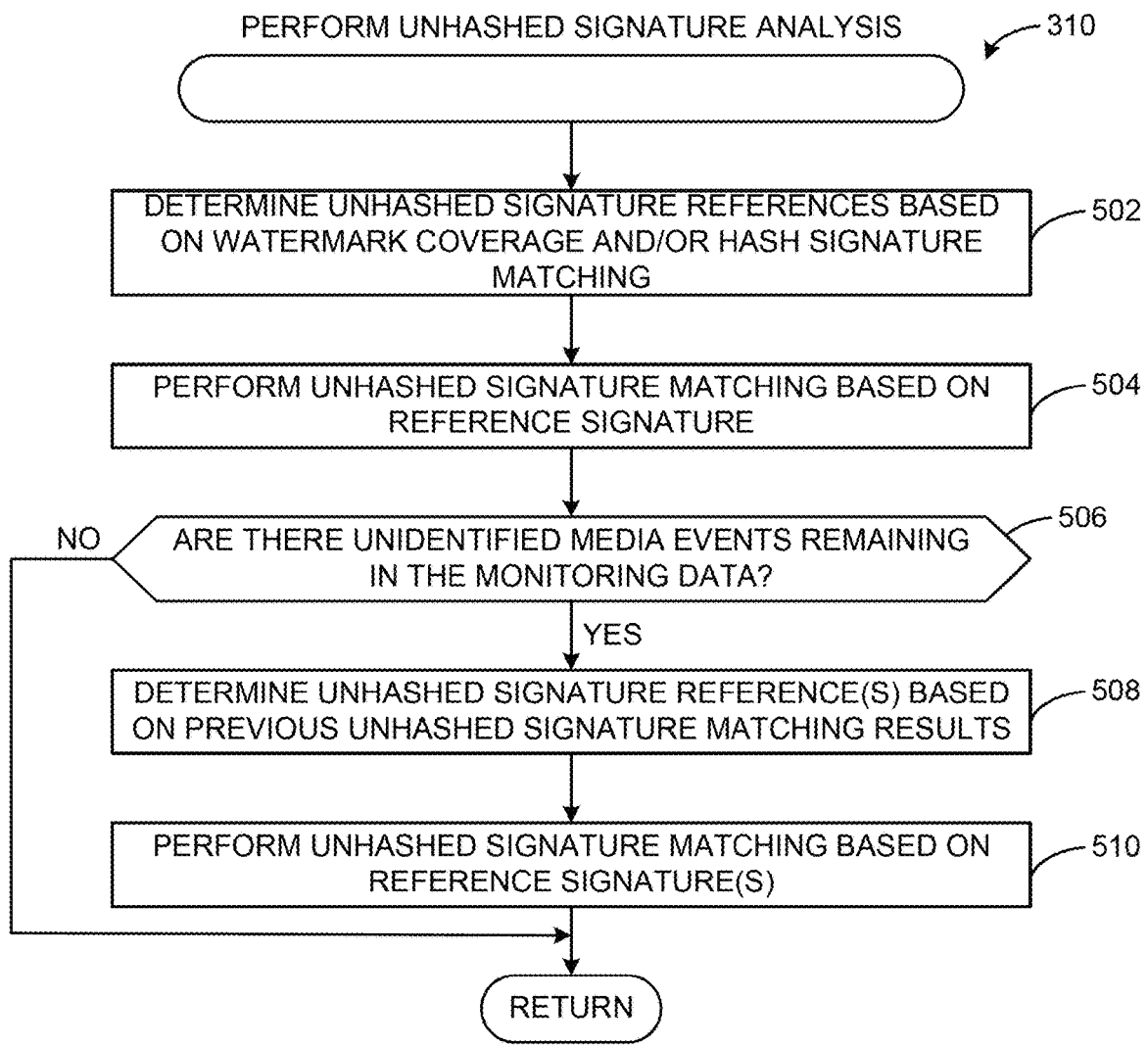

The program 500 of FIG. 5 describes the execution of block 310 of FIG. 3 in greater detail and includes block 502. At block 502, the unhashed signature reference determiner 210 determines unhashed fingerprint references based on watermark coverage and/or hashed matching. For example, the unhashed signature reference determiner 210 can determine reference signatures based on media events adjacent to media events with matched watermarks. In some examples, the unhashed signature reference determiner 210 can select any other appropriate signatures.

At block 504, the unhashed signature matcher 212 performs unhashed signature matching based reference signature. For example, the unhashed signature matcher 212 can identify media of the monitoring data 104 based signatures of the monitoring data and the signatures determined by the reference signatures.

At block 506, the unhashed signature matcher 212 determines if there are any unidentified media events remaining in the monitoring data. If the unhashed signature matcher 212 determines that there are unidentified media events remaining the monitoring data, the program 500 advances to block 508. If the unhashed signature matcher determines that there are not unidentified media events remaining in the monitoring data, the program 500 ends.

At block 508, the unhashed signature reference determiner 210 receives unhashed signature references based on previous unhashed signature matching results. For example, the unhashed signature reference determiner 210 can select reference signatures of adjacent media events identified during the execution of block 510.

At block 510, the performs unhashed signature matching based on reference signatures. For example, the unhashed signature matcher 212 can identify media of the monitoring data 104 based signatures of the monitoring data and the signatures determined by the reference signatures.

Figure 6:
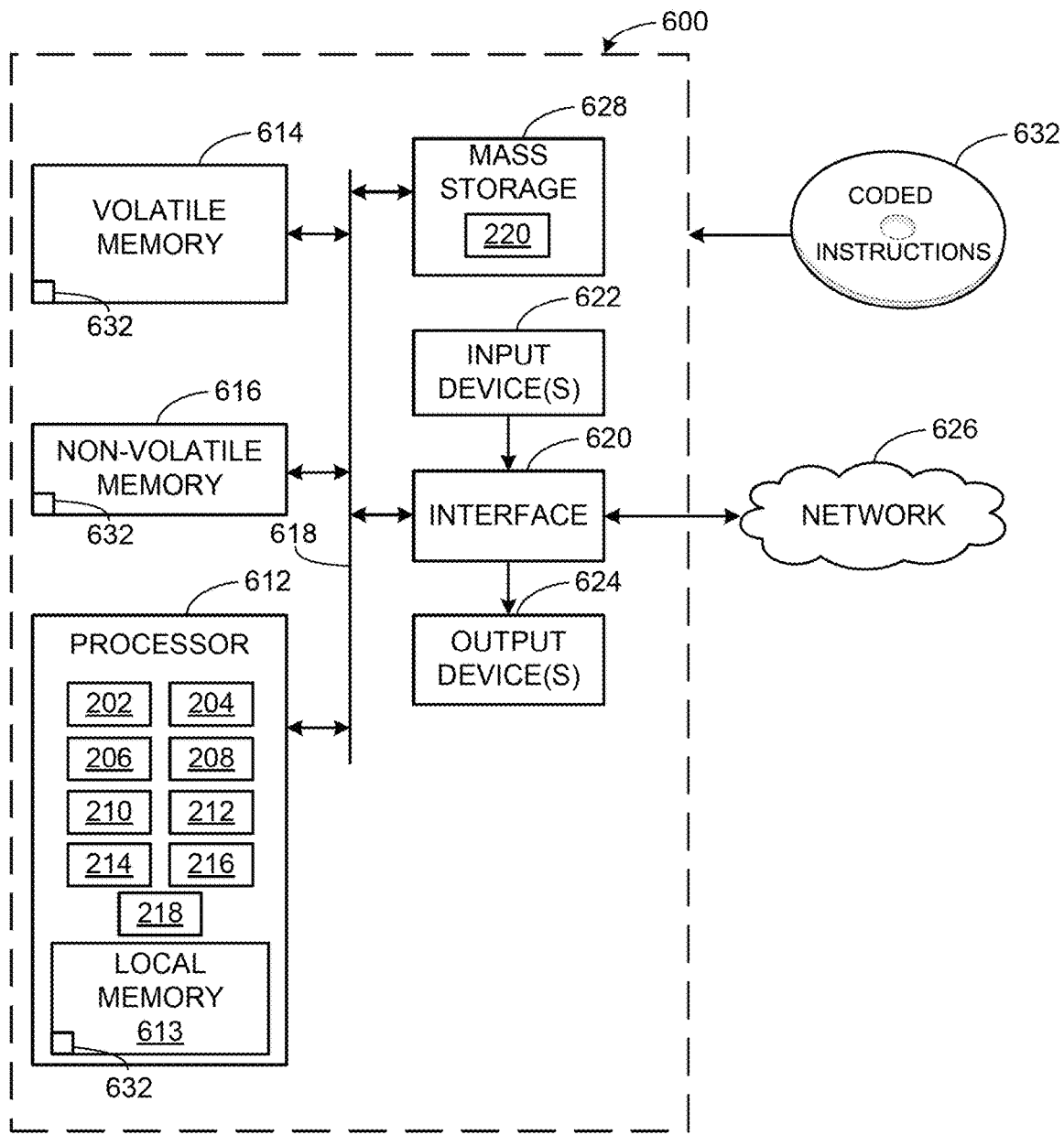
FIG. 6 is a block diagram of an example processing platform structured to execute the instructions of FIGS. 3-5 to implement the meter data analyzer of FIGS. 1 and 2.

FIG. 6 is a block diagram of an example processor platform 600 structured to execute the instructions of FIGS. 3-5 to implement the meter data analyzer 110 of FIG. 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example network interface 202, the example data segmenter 204, the example watermark matcher 206, the example offset determiner 208, the example unhashed signature reference determiner 210, the example unhashed signature matcher 212, the example signature matcher 212, the example hashed signature matcher 216, the example creditor interface 218 and the example reference database 220.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 3-5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that reduce that allow for optimization the identification media by using watermark matching. The disclosed methods, apparatus and articles of manufacture improve the efficiency of using a computing device by reducing computational and storage requirements of systems that identify media using signatures and/or watermarks. The disclosed examples prevent unneeded storage and generation of hashed signatures by relying on unhashed signatures and watermarks when possible. In some examples, the disclosed examples allow for signature matching and/or signature hashing to be excluded entirely, which vastly reduces computational and storage requirements for systems that identify media. The disclosed examples further prevent improper identification of media by relying on both watermarks and signatures. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An audience measurement computing system comprising:
    a processor; and
    a memory storing instructions that, when executed by the processor, cause the audience measurement computing system to perform operations comprising:
        obtaining, via a network interface, monitoring data characterizing a time period of a media event, wherein the monitoring data includes a first time segment and a second time segment;
        mapping a set of detected watermarks associated with the first time segment onto a corresponding set of reference watermarks stored in a reference watermark database, wherein the set of reference watermarks identify one or more reference media events associated with the first time segment;
        comparing detected timestamps associated with the set of detected watermarks and reference timestamps associated with the one or more media events identified by the corresponding set of reference watermarks;
        making a determination, based on the comparison of the detected timestamps with the reference timestamps, that a plurality of time offsets for ones of the set of detected watermarks correspond to a single time offset; and
        crediting media exposure during the first time segment based on the determination that the plurality of time offsets correspond to a single time offset.

2. The audience measurement computing system of claim 1, wherein the operations further include determining that the one or more reference media events identified by the set of reference watermarks correspond to a single media source.

3. The audience measurement computing system of claim 1, wherein the plurality of time offsets each characterize a time difference between a respective one of the detected timestamps and a corresponding one of the reference timestamps.

4. The audience measurement computing system of claim 1, wherein the single time offset corresponds to a live media presentation.

5. The audience measurement computing system of claim 1, wherein the operations further include determining that a second plurality of time offsets based on a second set of detected watermarks associated with the second time segment correspond to an interruption in a continuous media presentation during the second time segment.

6. The audience measurement computing system of claim 1, wherein the monitoring data includes an unhashed monitored signature associated with the second time segment, and wherein the operations further include:
    selecting an unhashed reference signature associated with either: (i) at least one of the set of detected watermarks of the first time segment, or (ii) at least one of the set of reference watermarks;
    comparing the selected unhashed reference signature with the unhashed monitored signature associated with the second time segment; and
    crediting media exposure during the second time segment based on the comparison of the selected unhashed reference signature with the unhashed monitored signature.

7. The audience measurement computing system of claim 6, wherein the operations further include hashing the unhashed monitored signature to generate a hashed monitored signature based on the comparison of the unhashed reference signature with the unhashed monitored signature.

8. The audience measurement computing system of claim 7, wherein the crediting media exposure during the second time segment is further based on a comparison of the hashed monitored signature with one or more hashed reference signatures included in a hashed reference signature database.

9. A non-transitory machine readable storage medium having stored thereon instructions that, when executed by at least one processor, cause performance of operations comprising:
    obtaining, via a network interface, monitoring data characterizing a time period of a media event, wherein the monitoring data includes a first time segment and a second time segment;
    mapping a set of detected watermarks associated with the first time segment onto a corresponding set of reference watermarks stored in a reference watermark database, wherein the set of reference watermarks identify one or more reference media events associated with the first time segment;
    comparing detected timestamps associated with the set of detected watermarks and reference timestamps associated with the one or more media events identified by the corresponding set of reference watermarks;
    making a determination, based on the comparison of the detected timestamps with the reference timestamps, that a plurality of time offsets for ones of the set of detected watermarks correspond to a single time offset; and crediting media exposure during the first time segment based on the determination that the plurality of time offsets correspond to a single time offset.

10. The non-transitory machine readable storage medium of claim 9, wherein the operations further include determining that the one or more reference media events identified by the set of reference watermarks correspond to a single media source.

11. The non-transitory machine readable storage medium of claim 9, wherein the plurality of time offsets each characterize a time difference between a respective one of the detected timestamps and a corresponding one of the reference timestamps.

12. The non-transitory machine readable storage medium of claim 9, wherein the single time offset corresponds to a live media presentation.

13. The non-transitory machine readable storage medium of claim 9, wherein the operations further include determining that a second plurality of time offsets based on a second set of detected watermarks associated with the second time segment correspond to an interruption in a continuous media presentation during the second time segment.

14. The non-transitory machine readable storage medium of claim 9, wherein the monitoring data includes an unhashed monitored signature associated with the second time segment, and wherein the operations further include:
   selecting an unhashed reference signature associated with either: (i) at least one of the set of detected watermarks of the first time segment, or (ii) at least one of the set of reference watermarks;
   comparing the selected unhashed reference signature with the unhashed monitored signature associated with the second time segment; and
   crediting media exposure during the second time segment based on the comparison of the selected unhashed reference signature with the unhashed monitored signature.

15. The non-transitory machine readable storage medium of claim 14, wherein the operations further include hashing the unhashed monitored signature to generate a hashed monitored signature based on the comparison of the unhashed reference signature with the unhashed monitored signature, and wherein the crediting media exposure during the second time segment is further based on a comparison of the hashed monitored signature with one or more hashed reference signatures included in a hashed reference signature database.

16. A method comprising:
   obtaining, via a network interface, monitoring data characterizing a time period of a media event, wherein the monitoring data includes a first time segment and a second time segment;
   mapping a set of detected watermarks associated with the first time segment onto a corresponding set of reference watermarks stored in a reference watermark database, wherein the set of reference watermarks identify one or more reference media events associated with the first time segment;
   comparing detected timestamps associated with the set of detected watermarks and reference timestamps associated with the one or more media events identified by the corresponding set of reference watermarks;
   making a determination, based on the comparison of the detected timestamps with the reference timestamps, that a plurality of time offsets for ones of the set of detected watermarks correspond to a single time offset; and
   crediting media exposure during the first time segment based on the determination that the plurality of time offsets correspond to a single time offset.

17. The method of claim 16, further including determining that the one or more reference media events identified by the set of reference watermarks correspond to a single media source.

18. The method of claim 16, further including determining that the single time offset corresponds to a live media presentation.

19. The method of claim 16, further include determining that a second plurality of time offsets based on a second set of detected watermarks associated with the second time segment correspond to an interruption in a continuous media presentation during the second time segment.

20. The method of claim 16, wherein the monitoring data includes an unhashed monitored signature associated with the second time segment, and wherein the method further includes:
   selecting an unhashed reference signature associated with either: (i) at least one of the set of detected watermarks of the first time segment, or (ii) at least one of the set of reference watermarks;
   comparing the selected unhashed reference signature with the unhashed monitored signature associated with the second time segment; and
   crediting media exposure during the second time segment based on the comparison of the selected unhashed reference signature with the unhashed monitored signature.

* * * * *